June 17, 1969  C. P. FLETCHER ET AL  3,450,981
VOLTAGE STABILIZING ARRANGEMENTS FOR ALTERNATING CURRENT
SUPPLIED UTILIZING SATURATED SHUNT REACTORS
Filed July 25, 1966

Fig. 1

INVENTORS
CHARLES PHILIP FLETCHER
ERICH SIEGFRIED FRIEDLANDER
MAURICE LESLIE MENZLER
DAVID JOHN YOUNG
BY
Kinchtens, Kinchtens & Ohlyes
ATTORNEYS

INVENTORS
CHARLES PHILIP FLETCHER
ERIC SIEGFRIED FRIEDLANDER
MAURICE LESLIE MENZLER
DAVID JOHN YOUNG

BY Kinchtein, Kinchtein, & Ottays
ATTORNEYS

United States Patent Office 3,450,981
Patented June 17, 1969

3,450,981
VOLTAGE STABILIZING ARRANGEMENTS FOR ALTERNATING CURRENT SUPPLIED UTILIZING SATURATED SHUNT REACTORS
Charles Philip Fletcher, Birmingham, Erich Siegfried Friedlander, Sutton Coldfield, and Maurice Leslie Menzler and David John Young, Birmingham, England, assignors to The General Electric Company Limited, London, England, a British company
Filed July 25, 1966, Ser. No. 567,163
Int. Cl. G05f 3/04
U.S. Cl. 323—60                                       12 Claims

ABSTRACT OF THE DISCLOSURE

An improved voltage stabilizing arrangement making use of at least one primary saturated shunt reactor having a plurality of reactor cores wound as for frequency multiplication with a phase displacement between core fluxes giving compensation of lower order harmonics, in combination with a compensating saturated reactor connected into a secondary mesh to reduce higher order harmonics.

---

This invention relates to voltage stabilizing arrangements for alternating current supplies, and in particular to stabilizing arrangements of this kind comprising at least one group of alternating current saturated reactors adapted to be connected in shunt with the supply system, usually with system capacitances or static capacitor banks, and arranged to operate in the alternating current saturated condition, such reactors hereinafter being referred to as saturated reactors.

An object of the invention is to provide a particularly advantageous stabilizing arrangement giving improved stability against sub-harmonics caused by interaction between circuit components.

According to the invention such a voltage stabilizing arrangement comprises a set of one or more series-connected groups of primary alternating current saturated reactors having a total of $n$ wound reactor cores connectable in shunt with the supply system, where $n$ is at least equal to five and $n/p$ is an integer, $p$ being the number of groups, and wherein the $n$ reactor cores are wound as for frequency multiplication, having primary windings connected so as to subject corresponding core fluxes to a phase displacement of $180°/n$ relative to one another for the suppression of harmonics below $2n-1$, and secondary windings in the form of a $n/p$-phase mesh in each of the $p$ groups, with a compensating reactor itself operable in the saturated condition connected into the mesh.

It has been found that in operation of such an arrangement there is a marked flattening of the top of the flux-wave produced in each of the reactor cores, this substantially trapezoidal flux-wave giving a vastly improved stability against sub-harmonics caused by the interaction between the primary saturated reactor and capacitors, compared with arrangements of known kind having parallel harmonic-compensating windings and short circuited mesh windings producing a sinusoidal flux wave in the reactor cores.

The invention has the further advantage that only relatively small filters, such as one for the second harmonic, are required, and of requiring saturated reactors cores of a much reduced iron volume to give an equal kva. output for a given slope of the saturated characteristic required, compared with arrangements in which harmonic compensation is effected by parallel connection of the reactor windings combined with the application of short circuited mesh windings or equivalent core constructions as will be apparent to those skilled in the art.

Two or more similar groups ($p>1$) of primary saturated reactors each having the same number of wound cores may be employed. For example one arrangement of this kind with $n=6$ which has been found to be particularly advantageous comprises two ($p=2$) three-core primary saturated reactor groups having primary windings each arranged in the manner of a frequency tripler and wound so that corresponding core fluxes are phase displaced by an angle of 30°, and connected in series with each other and each associated with a respective compensating reactor connected in series in a respective mesh winding so that tripler harmonic currents circulating through the two compensating reactors are displaced in phase by 90° with respect to each other at that frequency.

It is possible to tune the two primary saturated reactors for almost sinusoidal input currents by a suitable choice of compensating reactors, so that the waveshape is maintained extremely near to a sinusoidal function over the whole voltage and current range for which the arrangement is normally used.

To obtain the required phase shift of 30° (180/6) between the two primary saturated reactor groups, in such an arrangement both may be equally wound for a ±15° phase displacement, being provided with main windings in series but reversed phase sequence and separate secondary windings connected in mesh, with the respective compensating reactors connected in series into the mesh. Any other type of zig-zag connection producing the same relative phase displacement may be used. Alternatively one of the compensating reactors may be connected into the mesh formed by mesh-connected main primary windings. In the latter case the compensating reactor comprises three separate windings on a common core unit, each being connected in series to one of the main windings.

An arrangement in accordance with the invention may be used to reduce voltage fluctuations in electric supply networks having a common bus-bar system for feeding a plurality of fluctuating loads, such as due to arc furnaces, connected in parallel to the bus-bar system. In such and like cases a tap change may be associated with the reactors in conjunction with suitable capacitor banks for enabling the average voltage of the bus-bars to be maintained at the rated value regardless of the number of loads in circuit at any one time.

In order to explain the invention more fully several different embodiments of it will now be described by way of example with reference to FIGURES 1 to 15 of the accompanying schematic drawings.

Figure 1:
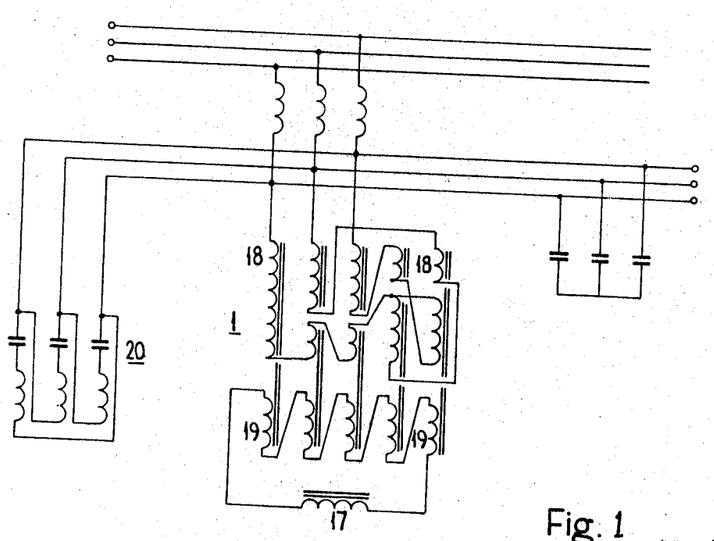
FIGURE 1 illustrates a voltage stabilizer incorporating a five-core saturated primary reactor, FIGURE 2 also illustrates a five-core saturated reactor arrangement but incorporating means for adjusting the flux wave shape automatically in dependence upon reactor current.

FIGURE 1 represents a voltage stabilizer in accordance with the invention incorporating a five core saturated reactor arrangement 1 ($n=5$) the reactors having primary windings 18 connected in the manner of voltage quintupler network for the suppression of harmonics below the ninth. Secondary windings 19 are connected in mesh and a reactor 17 is connected in series in the mesh, which series reactor is arranged to operate in the saturated condition in use of the arrangement, and it has been found that this results in a substantial reduction in the 9th and 11th harmonics. The arrangement incorporates an even harmonic filter network 20, and it has been found that even with very large buffer reactors and plain shunt capacitors such a filter network tuned to the 2nd or 4th harmonic depending on network conditions will in general be all that is required, apart from some very small filters (not shown) absorbing or damping any residual harmonics which may be desirable in practice.

The primary saturated recator could alternatively take the form of a 7-limb core having five limbs fitted with primary windings, but with the inductively loaded secondary windings replaced by a common winding surrounding the five wound limbs, the unwound limbs or the yoke dimensions being designed to have a saturation flux level which provides the optimum flattening of the flux wave.

Stabilized saturated reactors as above described may not only be used in conjunction with plain buffer reactors but also with 3-phase constant voltage transformers and current correctors such as are used for suppression of voltage fluctuations caused by fluctuating loads or the like, and may be used with advantage for general network or long transmission line stabilization, for arc furnace flicker suppression or for constant voltage transformers in conjunction with tapped air gap reactors.

In some cases, particularly where only a single saturated reactor group is employed, it may be found that over the range of variation in reactor current requied the flux wave departs slightly from the optimum shape, and means for compensating for this may then be employed to advantage. Thus the additional compensating reactor may in such cases comprise a transductor, means being provided for controlling the direct current flowing through the control winding of the transductor in response to changes in the reactor current. It has been found that by a suitable control of the transductor, hereinafter referred to a balancing tansductor, the optimum wave shape can be maintained for varying magnitudes of reactor current.

Figure 2:
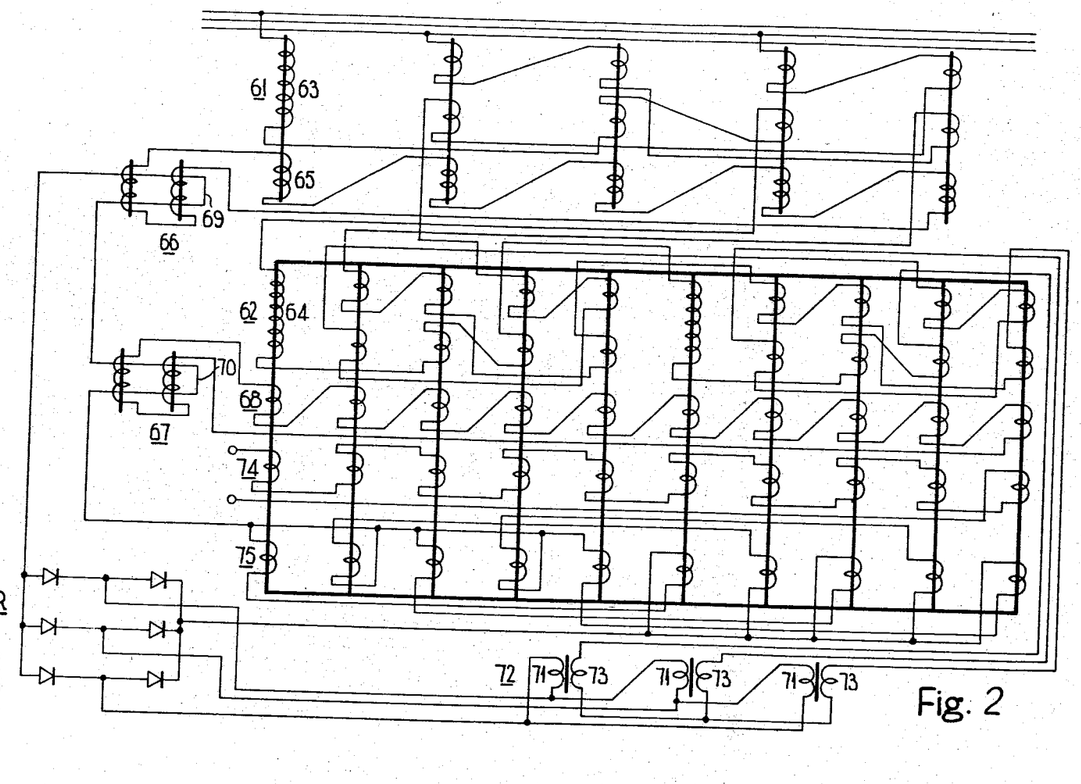

FIGURE 2 illustrates an arrangement designed for adjusting the flux wave shape automatically in dependence upon reactor current so as to obtain an optimum wave shape for varying magnitudes of current. Thus referring to this figure, 61 represents a five limb primary saturated reactor arrangement designed to be connected in shunt with a three-phase alternating current supply network to provide voltage stabilization, and an associated ten limb contol transductor 62, the main windings 63, 64, of the reactor and the transductor being wound and interconnected in the manner of a voltage quintupler network, and so that lower order harmonics up to the 9th harmonic are suppressed or internally balanced.

The primary saturated reactor 61 is provided with a mesh winding 65 connected in series with a first balancing transductor 66. A second balancing transductor 67 is connected in series with a mesh winding 68 of the control transductor. The effect of the balancing transductors and mesh windings is to produce a substantially trapezoidal flat-topped flux wave in each of the reactor cores and thereby reduce residual 9th and 11th harmonics, the arrangement providing a high degree of stability as previously explained. The transductors are controlled in such a manner that the flux- wave-shaped is substantially maintained for values of reactor current varying appreciably about a mean value. To effect this control, the control windings 69, 70 of the two balancing transductors 66, 67, are serially connected to the output of a full-wave rectifier R supplied with current by the secondary windings 71 of a three-phase current transformer 72 having its primary windings 73 interconnected with the main windings of the saturated reactor and the control transductor, so that the value of the control current through the control windings of the balancing transductors is dependent upon the reactor current, and so that variation of the mesh winding currents, resulting from changes in the main reactor current, provide the required degree of adjustment of the flux waves to maintain optimum compensation. External saturation control may be achieved by the provision of a control winding 74 on the control transductor as shown.

The arrangement illustrated also incorporates an additional feed-back control winding 75 on the control transductor 62, which is connected to the output of the rectifier R in series with the balancing transformer control windings 69, 70, the purpose of this feed-back control being to obtain a characteristic approaching a constant voltage feature similar to that of the saturated reactor. Preferbly the feed-back excitation approaches 100% self excitation so that only a minor external control current is required to change the operating point of the reactor-transductor combination. This can then be used for instance for closed loop voltage control or other network requirements.

Figure 3:
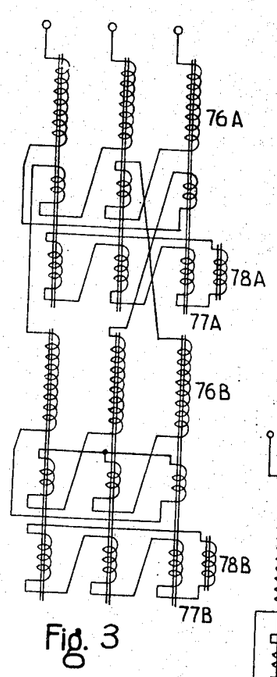
FIGURES 3 to 5 illustrate three different embodiments incorporating pairs of saturated reactor groups connected in series.

Referring to FIGURE 3, 76A and 76B are two identical three-core saturated reactor groups having zig-zag windings connected to give a ±15° phase shift between the core fluxes of the two reactor groups, the sign reversal being obtained by reversal of the phase-sequence connection between the groups.

In addition each reactor group 76A, 76B, has a secondary mesh winding 77A, 77B, incorporating a saturating compensating reactor 78A, 78B, respectively connected in series in the mesh, and designed so that residual harmonics in the respective primary currents of the order of $2n\pm1$ are reduced at least approximately to a minimum; the arrangement gives a displacement in phase of the triple harmonic currents circulating through the compensating reactors of 90°. It has been found that in this arrangement in addition to suppression of the 5th and 7th harmonics by the phase shift principle of compensation, the 11th and 13th harmonics are also effectively suppressed by the current circulating through the compensating reactors over effectively the whole range of voltage and curent for which the arrangement is designed to be used.

Figure 4:
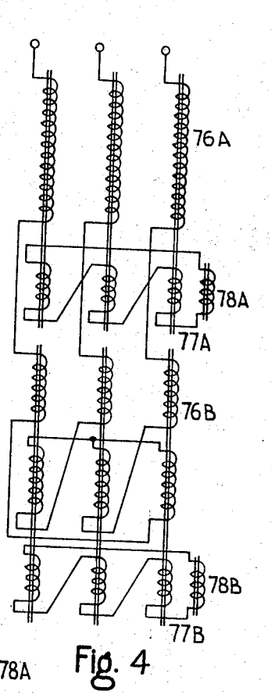

FIGURE 4 shows an equivalent star and 30° zig-zag connection of the two primary reactor groups 76A, 76B, each group again having a secondary mesh winding 77A, 77B with a reactor 78A, 78B, respectively connected in series in the mesh as shown, the arrangement also providing effective suppression of the 11th and 13th and other lower order harmonics.

Figure 5:
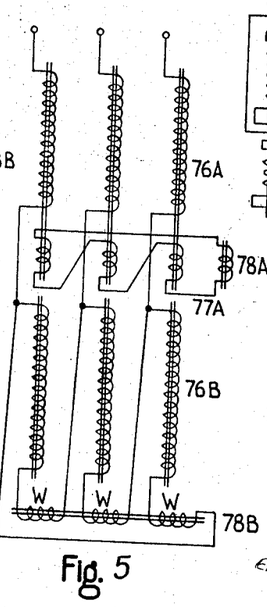

FIGURE 5 represents a star+delta connection of the two reactor groups, the compensating reactor 78B in this arrangement being effectively connected into the loop of a mesh winding provided by the main windings of the saturated reactor group 76B as shown, and comprising three windings W on a common core. These windings do not contribute any fundamental ampere turns, but serve to give the same balancing effect as the corresponding reactor 78B in the 30° zig-zag connected reactor group of FIGURE 4. The advantage of this arrangement is a very simple winding on all cores without tappings.

It will be appreciated that in extreme cases some harmonic filters may still be required, but with the arrangements described only relatively small even harmonic filters will, in general, only be necessary with a consequent saving in cost. A further saving of cost is achieved by the improved flattening of the flux wave with the increased number of cores ($n=6$) in these cases.

Figure 6:
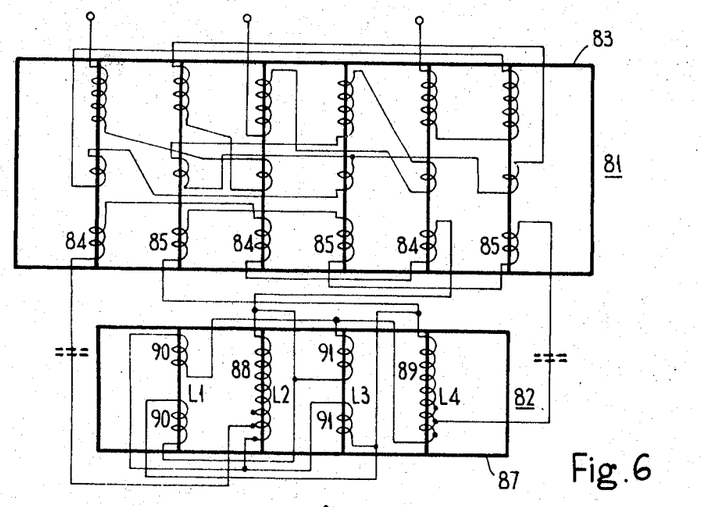
FIGURE 6 illustrates an arrangement in which two three-core reactor groups are formed as a single unit.

The arangement illustrated in FIGURE 6 comprises a main saturated reactor unit 81, and a compensating saturated reactor unit 82. The main reactor consists in effect, of two similar three-core primary saturated reactor groups each wound in the manner of a frequency tripler with zig-zag windings connected to give a ±15° phase shift between the core fluxes of the two reactor groups, the sign reversal being obtained by reversal of the phase-sequence connection between the groups. The windings of the reactor groups are arranged on six limbs of a common eight-limb core unit 83 as shown, the windings of the first reactor group being on the second, fourth and sixth limbs, the windings of the second group being on the third, fifth and seventh limbs, and the first and last limbs being unwound. This distribution gives a minimum yoke flux with further consequent saving of active material.

In addition each group has a secondary mesh winding 84, 85, respectively each having connected in series in the mesh a winding of the compensating reactor 82 as will subsequently be explained.

The compensating reactor comprises an alternating current saturated reactor having a common six-limb core 87 with four wound limbs L1, L2, L3, L4, the wound limbs L2 and L4 carrying the main compensating windings 88, 89 in series respectively in the mesh windings 84, 85, of the two reactor groups. The wound limbs L1 and L3 carry additional windings 90, 91, so connected as to provide mutual compensation of harmonics generated in the mesh windings.

Figure 7A:
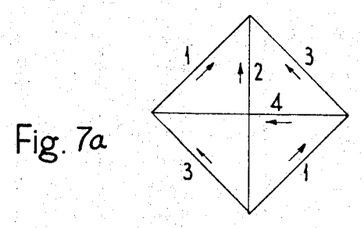
FIGURE 7 represents a vector diagram and FIGURE 8 a typical voltabe current characteristic explaining the arrangement of FIGURE 6.
Figure 7B:
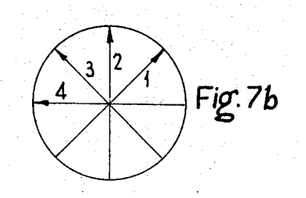

The winding scheme—one of many different solutions which will be obvious to those skilled in the art—is explained by the vector diagram, FIGURE 7 which shows under (a) the phase position of the individual voltages on limbs L1 to L4 contributing to the total pattern and in (b), the resulting symmetrical star system with $n=4$ giving a lowest harmonic of 7's and 9's referred to the 3rd harmonic, i.e. 21st and 27th harmonic of the primary system. By providing some tappings on the main compensating windings 88, 89, it will be possible to control the range of compensation for optimum adaptation to the required level.

Figure 8:
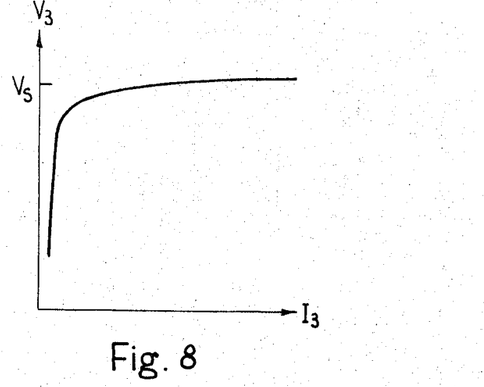

FIGURE 8 illustrates a typical form of voltage/current characteristic of the arrangement and it has been found that by appropriate shaping of the magnetic characteristic of the compensating reactor and/or the main reactors an optimum voltage which remains almost constant over a wide range of current may be obtained.

Generally, the shaping of any magnetic characteristic that may be required can be achieved by controlling three parameters of a primary saturated reactor.

The addition of series capacitors (C), as shown dotted, in the leads between the mesh windings 84, 85, and the compensating reactor 82 could be also used to improve the overall shaping of the characteristic of necessary.

Control over the level of the characteristic may be achieved by providing tap changing facilities on the main compensating reactor windings, and the slope of the compensating reactor characteristic may be varied by the addition of series capacitors in the leads between the mesh windings and the compensating reactor.

Figure 9:
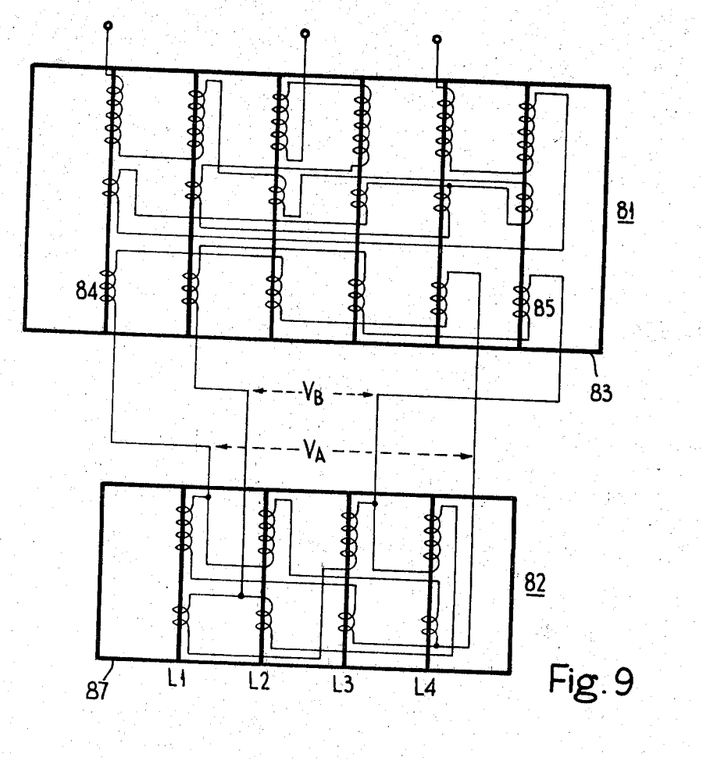
FIGURE 9 illustrates a modification of the arrangement shown in FIGURE 6.

The arrangement illustrated in FIGURE 9 is somewhat similar to that shown in FIGURE 6 and comprises a primary saturated reactor unit 81, and a compensating saturated reactor unit 82, the main reactor consisting, in effect, of two similar three-core saturated reactor groups on a common eight-limb core and each wound in the manner of a frequency tripler with zig-zag windings connected to give a ±15° phase shift between the core fluxes of the two reactor groups as in the previous arrangement.

Each group similarly has a secondary mesh winding 84, 85, respectively each having connected in series in the mesh a winding of the compensating reactor 82.

The compensating reactor comprises an alternating current saturated reactor having a common six-limb core 87 with four wound limbs L1, L2, L3, L4, and all four limbs having equal windings with a turns ratio equivalent to tan 22½° and connected to 90° phase displaced voltages $V_A$, $V_B$, so as to give a phase displacement between the voltages and the fluxes developed of 0±22½° and 90°±22½° in the compensating circuit. The choice of flux phase direction is such that the yoke fluxes are held to a minimum, this being achieved by arranging that the fluxes in limbs L2 and L4 ae reversed relative to limbs L1 and L3.

Figure 10:
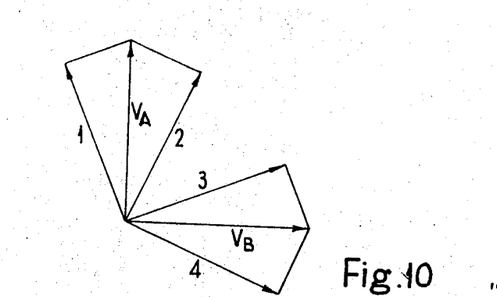
FIGURE 10 represents a vector diagram explaining the operation of the FIGURE 9 arrangement.

The resulting vector diagram is illustrated in FIGURE 10 and we have found that such an arrangement is highly effective in equalizing the saturation of the core limbs and giving greatly improved compensation compared with the arrangement of FIGURE 6.

In an alternative arrangement with the four limbs excited by 90° phase displaced currents, the associated core windings may be connected in series and with a turns ratio giving a 22½° phase displacement between the current in one of the two sets of windings and the resulting ampere turns.

Where more than two saturated reactor groups are employed a correspondingly greater number of saturated core limbs will be required in the compensating reactor to achieve appropriate compensation.

Instead of the two saturated reactor groups of FIGURES 6 and 9 being arranged as voltage triplers, they may be in the form of quintuplers, or other frequency multipliers connected either in series or in parallel.

An alternative arrangement may comprise two sub-groups of five reactors each having a 36° phase displacement between individual fluxes with each sub-group wound so that their corresponding fluxes are 18° displaced relative to each other.

Figure 11:
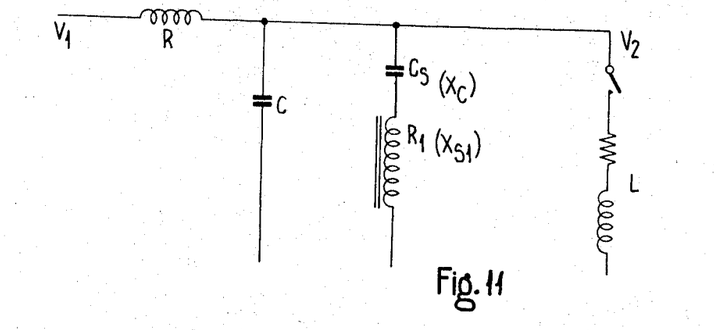
FIGURES 11 to 13 illustrate three different arrangements incorporating capacitors in series with the saturated primary reactors.

FIGURE 11 illustrates in diagrammatic form an arrangement in which the primary saturated reactor arrangement in accordance with the invention, shown at $R_1$ has associated with it a series connected slope-correction capacitor $C_S$ for controlling the voltage change required to produce a given change of reactive current. In this figure which is shown in single phase for simplicity R represents the line reactance and L the load.

Shunt capacitors may also be connected in parallel with groups of saturated reactors combined with such series "slope correction" capacitors to supply the capacitive power requirements of the load and those additional requirements which may be due to the line resistance, and provided the line impedance is not unduly high, that is to say, as long as the short circuit current at the point in the network to which such a slope corrected saturated reactor arrangement is connected is large relative to the current of the shunt capacitor, the required stability is obtained.

Figure 12:
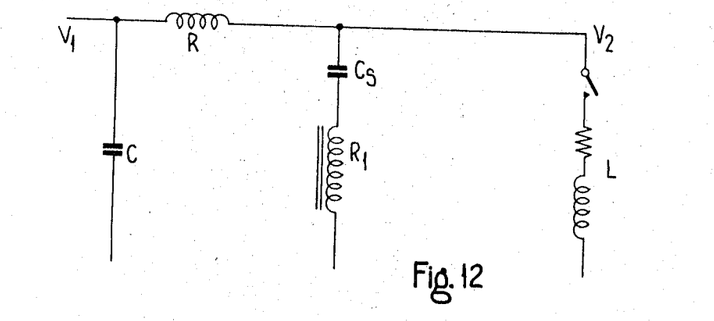

In FIGURE 12, C is such a shunt capacitor for supplying the capacitive power requirements of the load.

Where there is a high line reactance the shunt capacitor C may be connected to the supply side of the line reactor R as shown in FIGURE 12. Such an arrangement is inherently stable and gives a good response to voltage fluctuations either in the supply or due to variations in load current, and it may for example be used to advantage as a voltage stabilising arrangement for use with high power electric arc furnaces, to prevent load current fluctuations having any significant effect on the voltage of the supply network. However the magnitude of the permissible reactance R in FIGURE 11 is limited by its effect on possible instabilities that can be caused by its magnitude relative to the capacitor C.

A second saturated reactor may be connected in parallel with a main saturated reactor group and series "slope correction" capacitor combination and stabilizer itself by a small 2nd harmonic filter connected in parallel with the slope corrected reactor group and said second saturated reactor. The second saturated reactor serves to eliminate the effect of the high line impedance by pre-stabilizing the system at the point to which the slope corrected reactor is to be connected in such a way that it behaves as if the supply impedance were low.

Figure 14:
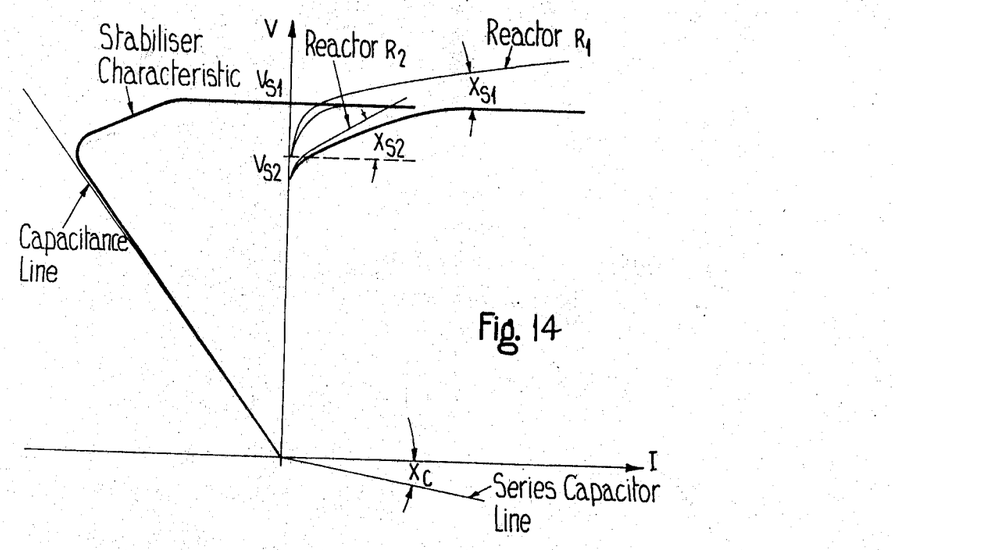
FIGURE 14 shows the typical characteristic of the arrangement of FIGURE 13.

The arrangement illustrated in FIGURE 14 makes use of such an additional saturated reactor $R_2$ together with a second harmonic filter F each of which is shunted across the primary saturated reactor $R_1$ and the associated series capacitor $C_S$. A fourth harmonic filter (not shown) may also be connected across the series combination of reactor and capacitor in some cases.

The saturation reactance of the additional saturated reactor $R_2$ together with the second and, where provided, the fourth harmonic filter serves to pre-stabilise the system by virtually eliminating the effect of the large line reacatnce by means of the saturated reactor $R_2$ in a manner allowing the sensitivity of the main saturated reactor core $R_1$ to become effective without causing unstable fluctuations of the load voltage.

The whole unit provided by the series combination of reactor R1 and capacitor $C_S$, the harmonic filter or filters and the additional stabilising reactor $R_2$ as shown within the broken line, can be connected across a high impedance line to produce the equivalent of an infinitely stiff- bus-bar to which any load may be connected within the reactive power capacity of the equipment without causing any significant amount of voltage variations.

Figure 13:
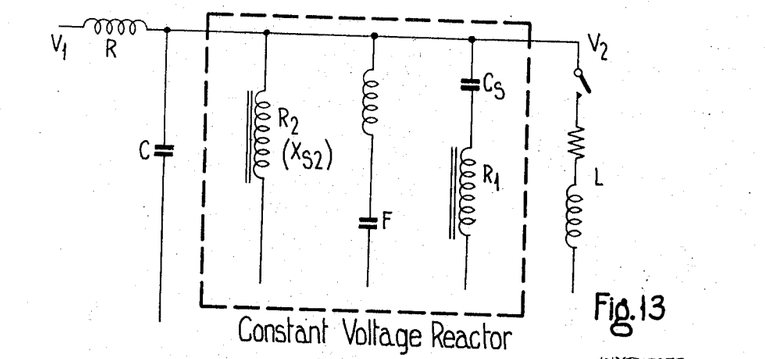

The overall characteristic of units of the kind shown in FIGURE 13 is developed in FIGURE 14. The saturation voltage $V_{s2}$ of the stabilising reactor $R_2$ must be lower than the saturation voltage $V_{s1}$ of the primary reactor $R_1$, and the stabilising reactor $R_2$ will be on almost constant load, the reactive power it takes just absorbing a fixed proportion of the total capacitance C. The output voltage will be constant over a wide range of reactive current until the current of the reactor $R_1$ approaches zero. At this point the reactor $R_2$ will still carry current and on further requirement of reactive current the voltage may droop by some value in the order of say 10% to 15%. The circuit will in this range behave as if the stabiliser would consist only of the capacitor C and the reactance $X_{s2}$ of the reactor $R_2$, i.e. it will still act as a stabilising unit only with the usual slope of a plain reactor stabiliser. Only when the second reactor also reaches zero current will the system be left with the shunt capacitance alone and with further reduction of voltage, the reactive power will then drop in the way usual for any plain shunt capacitors as shown by the "capacitance line."

The slope of the primary reactor $R_1$ may be controlled by tuning the series capacitor $C_S$ more or less to the total or only a fraction of the slope reactance $X_{s1}$ of the reactor and this can be made adjustable by subdividing the series capacitor in preferably series connected units which can be short circuited in sections, if so required.

Figure 15:
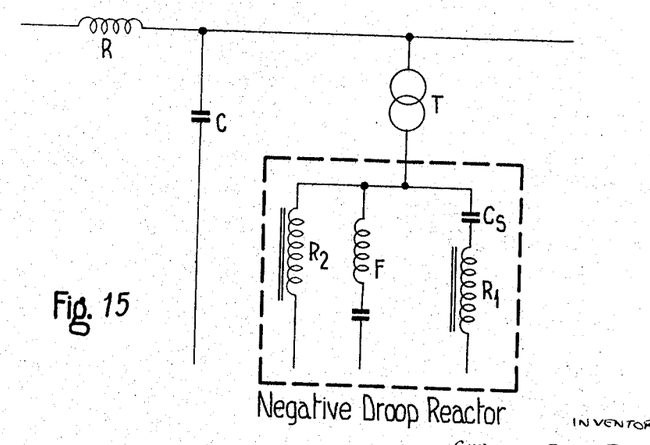
FIGURE 15 illustrates an arrangement of FIGURE 13 modified to give a constant voltage output.

The stability of the combination shown in FIGURE 14 is such that the series capacitor $C_S$ can even be chosen to have a reactance $X_c > -X_{s1}$. That means it is possible to overcompensate the slope of the saturated reactor characteristic and give correspondingly to the complete "constant voltage reactor" unit of FIGURE 14 the characteristic of a reactor with a drooping characteristic. This may have a particular advantage for application in very high voltage networks where it will not be practical to connect the complex winding of the compensated saturated reactor straight to the highest voltage level so that an insulating transformer T will have to be interposed. If the new reactor with a drooping characteristic is then connected to the secondary winding of such interposing transformer T which may include also tap-changing facilities, the droop of the characteristic may be chosen so that it compensates at the same time for the leakage reactance of the transformer so that a constant voltage effect is obtained on the now stabilised high voltage level. The resulting scheme is shown in FIGURE 15.

In general it will be desirable to protect the series capacitor associated with each main saturated reactor against transient overvoltages, caused for example by switching processes, by any suitable form of surge absorbers, spark gaps, gas discharge devices or sequential switching, as will be demanded by circumstances in order to avoid the need for an excessively high voltage rating of the series capacitor.

Damping resistors or small discharge reactors having a high impedance under normal operating conditions or both in series may be connected across each series capacitor to prevent any instabilities such as due to the retention of electrostatic charges, or due to self excitation of low frequencies.

We claim:

1. A voltage stabilizing arrangement for an alternating current supply system comprising a set of one or more series-connected groups of primary alternating current saturated reactors having a total of $n$ wound reactor cores connectable in shunt with the supply system, where $n$ is at least equal to five and $n/p$ is an integer, $p$ being the number of groups, and wherein the $n$ reactor cores are wound as for frequency multiplication, having primary windings connected so as to subject corresponding core fluxes to a phase displacement of $180°/n$ relative to one another for the suppression of harmonics below $2n-1$, and secondary windings in the form of a $n/p$-phase mesh in each of the $p$ groups, with a compensating reactor itself operable in the saturated condition connected into the mesh.

2. A voltage stabilizing arrangement according to claim 1 including a plurality of groups of primary saturated reactors each having the same number of wound cores.

3. A voltage stabilizing arrangement according to claim 2 including two groups of primary saturated reactors each comprising three wound cores, the cores of each group being wound as a frequency tripler and the primary windings being connected in series with each other and giving a phase displacement between corresponding core fluxes of 30°, and each group being associated with a respective saturated compensated reactor connected in series in a respective mesh winding to give a displacement of phase of 90° between the tripler harmonic currents circulating through the compensating reactors.

4. A voltage stabilizing arrangement according to claim 3 wherein the compensating reactor windings of the two groups are combined to form a saturated reactor unit having a plurality of wound core limbs provided with additional windings connected to provide mutual compensation of harmonics generated in the two compensator reactor windings.

5. A voltage stabilizing arrangement according to claim 4 wherein the two similar groups of primary saturated reactors are themselves combined as a single reactor unit.

6. A voltage stabilizing arrangement according to claim 1 incorporating a single group of primary saturated reactors having five cores wound as a voltage quintupler, and a respective mesh winding having a saturated compensating reactor connected in series therein.

7. A voltage stabilizing arrangement according to claim 1 incorporating two primary saturated reactor groups providing voltages of triple frequency feeding the compensating reactor which are 90° phase displaced and the compensating reactor has four wound limbs with windings connected to give a phase displacement of the voltages and fluxes of $0°\pm22½°$ and $90°\pm22½°$ in the compensating circuit.

8. A voltage stabilizing arrangement according to claim 1 having at least one shunt capacitor connected in parallel with the primary saturated reactor.

9. A voltage stabilizing arrangement according to claim

1 having at least one capacitor connected in series with each primary saturated reactor for controlling the voltage change to produce a given change of reactive current.

10. A voltage stabilizing arrangement according to claim 9 wherein an additional saturated reactor is connected in parallel with a primary saturated reactor and series capacitor combination and is itself stabilized by at least one filter connected in parallel therewith.

11. A voltage stabilizing arrangement according to claim 1 wherein the compensating reactor comprises a transductor and means is provided for controlling the direct current flowing through the control winding of the transductor in response to changes in the reactor current.

12. A voltage stabilizing arrangement according to claim 11 including rectifying means for supplying the transductor with direct current derived from the reactor current.

References Cited

UNITED STATES PATENTS

| | | | |
|---|---|---|---|
| 3,162,800 | 12/1964 | Friedlander et al. | 323—60 |
| 3,193,758 | 7/1965 | Friedlander | 323—60 |
| 3,054,939 | 9/1962 | Thompson | 321—27 X |
| 3,085,188 | 4/1963 | Drabeck et al. | 321—25 X |
| 3,205,430 | 9/1965 | Tango et al. | 323—76 |
| 3,214,681 | 10/1965 | Tango et al. | 323—76 |
| 3,263,148 | 7/1966 | Biringer | 323—76 X |
| 3,293,537 | 12/1966 | Sola | 323—76 X |
| 3,259,828 | 7/1966 | Biringer | 323—76 X |
| 3,371,263 | 2/1968 | Walz et al. | 321—25 |

JOHN F. COUCH, *Frimary Examiner.*

G. GOLDBERG, *Assistant Examiner.*

U.S. Cl. X.R.

13—12; 323—81, 83, 89

PO-1050
(5/69)

UNITED STATES PATENT OFFICE
CERTIFICATE OF CORRECTION

Patent No. 3,450,981  Dated  June 17, 1969

Inventor(s) Charles Philip Fletcher, et al

It is certified that error appears in the above-identified patent and that said Letters Patent are hereby corrected as shown below:

In the title after the line reading "Filed July 25, 1966, Ser. No. 567,163" and before the line specifying the number of claims and the class and sub-class, insert
-- Claims Priority, Applications Great Britain July 26, 1965, 31,746/65; September 24, 1965, 40,784/65; October 18, 1965, 43,985/65; January 28, 1966, 3,951/66; February 17, 1966, 7,052/66; April 15, 1966, 16,700/66; May 20, 1966, 22,641/66.--

SIGNED AND
SEALED
DEC 2 - 1969

(SEAL)
Attest:

Edward M. Fletcher, Jr.
Attesting Officer

WILLIAM E. SCHUYLER, JR.
Commissioner of Patents